(12) United States Patent
Frieb-Preis et al.

(10) Patent No.: US 8,430,446 B2
(45) Date of Patent: Apr. 30, 2013

(54) SPINDLE DRIVE

(75) Inventors: Timo Frieb-Preis, Münstermaifeld (DE); Michael Kleinmann, Guellesheim (DE)

(73) Assignee: Stabilus GmbH, Koblenz (DE)

( * ) Notice: Subject to any disclaimer, the term of this patent is extended or adjusted under 35 U.S.C. 154(b) by 1680 days.

(21) Appl. No.: 11/880,519

(22) Filed: Jul. 23, 2007

(65) Prior Publication Data

US 2009/0011894 A1 Jan. 8, 2009

(30) Foreign Application Priority Data

Jul. 22, 2006 (DE) .......................... 10 2006 033 982

(51) Int. Cl.
*B60J 5/00* (2006.01)
(52) U.S. Cl.
USPC ........................ 296/146.4; 74/89.35; 74/89.39
(58) Field of Classification Search ................ 296/146.4, 296/155; 74/89.39, 89.35, 89.38
See application file for complete search history.

(56) References Cited

U.S. PATENT DOCUMENTS

| 5,187,993 A * | 2/1993 | Nicholson et al. ........... 74/89.38 |
| 8,024,987 B2 * | 9/2011 | Yamaguchi et al. ......... 74/89.23 |
| 8,027,769 B2 * | 9/2011 | Oualkadi et al. ................ 701/49 |
| 2004/0090083 A1 * | 5/2004 | Greuel et al. .............. 296/146.4 |

FOREIGN PATENT DOCUMENTS

| DE | 103 13 440 A1 | 10/2004 |
| EP | 1840310 A1 * | 10/2007 |
| EP | 1840311 A1 * | 10/2007 |
| EP | 2199513 A1 * | 6/2010 |

* cited by examiner

Primary Examiner — Glenn Dayoan
Assistant Examiner — Pinel Romain
(74) Attorney, Agent, or Firm — Cozen O'Connor

(57) ABSTRACT

A spindle drive for a movable component includes a threaded spindle, which can be driven in rotation about a rotational axis by a reversible drive. A spindle nut is mounted nonrotatably on the spindle. By means of the spindle nut, a transmission element connected to the movable component can be driven axially with respect to the spindle axis. The spindle nut can be connected to and disconnected from the transmission element by a connecting device. A nut position sensor detects the position of the spindle nut and a component sensor detects the axial position of the transmission element. If it is concluded that there is plausibility between the signals of the nut position sensor and the component sensor, the spindle nut can be connected to the transmission element by the connecting device.

14 Claims, 2 Drawing Sheets

SPINDLE DRIVE

BACKGROUND OF THE INVENTION

1. Field of the Invention

The present invention relates to a spindle drive for a movable component, the drive having a threaded spindle which is rotatably driven around its axis by a reversible drive, and a spindle nut mounted nonrotatably on the spindle, a transmission element connected to the movable component being driven axially with respect to the spindle axis by the spindle nut.

2. Description of the Related Art

In a spindle drive for pivoting an automatically actuatable vehicle door, it is known that the threaded spindle can be rotated by an electric motor powered-drive acting by way of a gearbox and a releasable clutch.

In the known spindle drive, a sensor detects the application of manual force on the vehicle door, and a corresponding signal is sent to control electronics. The control electronics then actuate the clutch to disconnect the drive from the threaded spindle, so that the vehicle door can be easily moved by hand.

However, the known spindle drive requires a large amount of space because of the clutch. The clutch is also a complicated and expensive component.

SUMMARY OF THE INVENTION

An object of the present invention is to create a spindle drive for a movable component which allows the movable component to be moved by the drive and also easily moved by hand, uses only a small amount of installation space and can be built both easily and at low cost.

The object is met according to an embodiment of the present invention by a drive having a threaded spindle and a spindle nut threadably mounted on the spindle, and a connecting device configured to connect and disconnect the spindle nut with a transmission element. The drive further includes a nut position sensor configured to detect an axial position of the spindle nut on the threaded spindle at any moment and a component sensor is configured to detect the axial position of the transmission element relative to the spindle axis at any moment, the corresponding signals being transmitted from the nut position sensor and from the component sensor to a control unit. The spindle nut can be connected to the transmission element by the connecting device if it is concluded that the signals from the nut position sensor and the component sensor are plausible and/or indicate that the nut and the transmission component are in the same axial position.

When the spindle nut is connected to the transmission element, the movable component can be moved by the drive.

If the component is to be moved by hand, the connecting device disconnects the transmission element from the spindle nut, so that the movable component can be easily moved.

After the movable component has been moved by hand, the transmission element is in a different position than the spindle nut. For this reason, the spindle nut must first be moved into the same position as that of the transmission element before the connecting device can connect the spindle nut to the transmission element.

This is accomplished by the drive which drives the threaded spindle. The control unit receives the signals from the nut position sensor and the component sensor continuously and checks them for plausibility.

After the transmission element and the spindle nut have arrived in the same position, the control unit, which is preferably an electronic control unit, actuates the connecting device so that it engages, i.e., so that the spindle nut and the transmission element are connected to each other again.

Instead of the signals from the nut position sensor and the component sensor being detected continuously, it is possible for only the starting positions of the spindle nut and of the transmission element to be detected. On the basis of the difference between their positions as determined by the control unit, the spindle nut can then be driven into the position which agrees with that of the transmission element.

The drive is preferably an electric motor-powered drive, which can also be installed at some other point and connected to the threaded spindle by means of, for example, a flexible shaft.

In a simple and space-saving design, the spindle nut can have a radial driver arm, which can be pivoted between a connecting position and a disconnecting position. When the driver arm is in the connecting position, its free end engages with a claw on the transmission element and thus exerts force on it in the axial direction. When the driver arm is in the disconnecting position, it is not engaged with the claw.

It is especially space-saving for the threaded spindle and the spindle nut to be coaxially enclosed by an axially stationary, pivotably supported guide tube and for the driver arm to project through an axial driver slot in the guide tube, the length of the slot corresponding at least to the axial distance over which the spindle nut can move. The spindle nut can be pivoted, thus taking the driver arm along with it, between the connecting position and the disconnecting position. A space-saving, concentric design is thus made possible.

A gear wheel or toothed segment can be connected coaxially to the guide tube so that the tube can be pivoted. A drive pinion of a reversible pivot drive engages in the gear wheel or toothed segment either directly or by way of a gear stage.

In an alternative embodiment for pivoting the guide tube, a groove provided in the guide tube extends at an angle to the spindle axis. A groove block, which can be driven axially with respect to the spindle axis by a reversible axial drive, projects into the groove.

The pivot drive may also be an electric motor-powered pivot drive, or the axial drive can also be an electric motor-powered axial drive.

According to a simple embodiment for the actuation of the component sensor, the transmission element can have a sensor arm, which can be moved along a sensor track of the component sensor extending axially with respect to the spindle axis. The component sensor is preferably a position potentiometer.

According to a simple embodiment for the actuation of the nut position sensor, the spindle nut can have a second radial sensor arm, which projects through an axial sensor slot in the guide tube, the length of the slot corresponding at least to the distance over which the spindle nut can move. The second sensor arm can be moved along a second sensor track of the nut position sensor extending axially with respect to the spindle axis. The nut position sensor is preferably a position potentiometer.

So that the nut position sensor can be operated easily, a wiper can be guided with freedom of axial movement on the second sensor track. The wiper has another claw, into which the free end of the second sensor arm projects. If the movable component is a pivoting component, the transmission element will be hinged to the pivoting component a certain radial distance away from the pivot axis.

The movable component is preferably a door or a hatch of a motor vehicle.

The movable component may be a component which pivots around a pivot axis, but it can also be a component which moves in linear fashion.

The guide tube or the threaded spindle, furthermore, can be driven in rotation by a gearbox.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figures 1, 2:
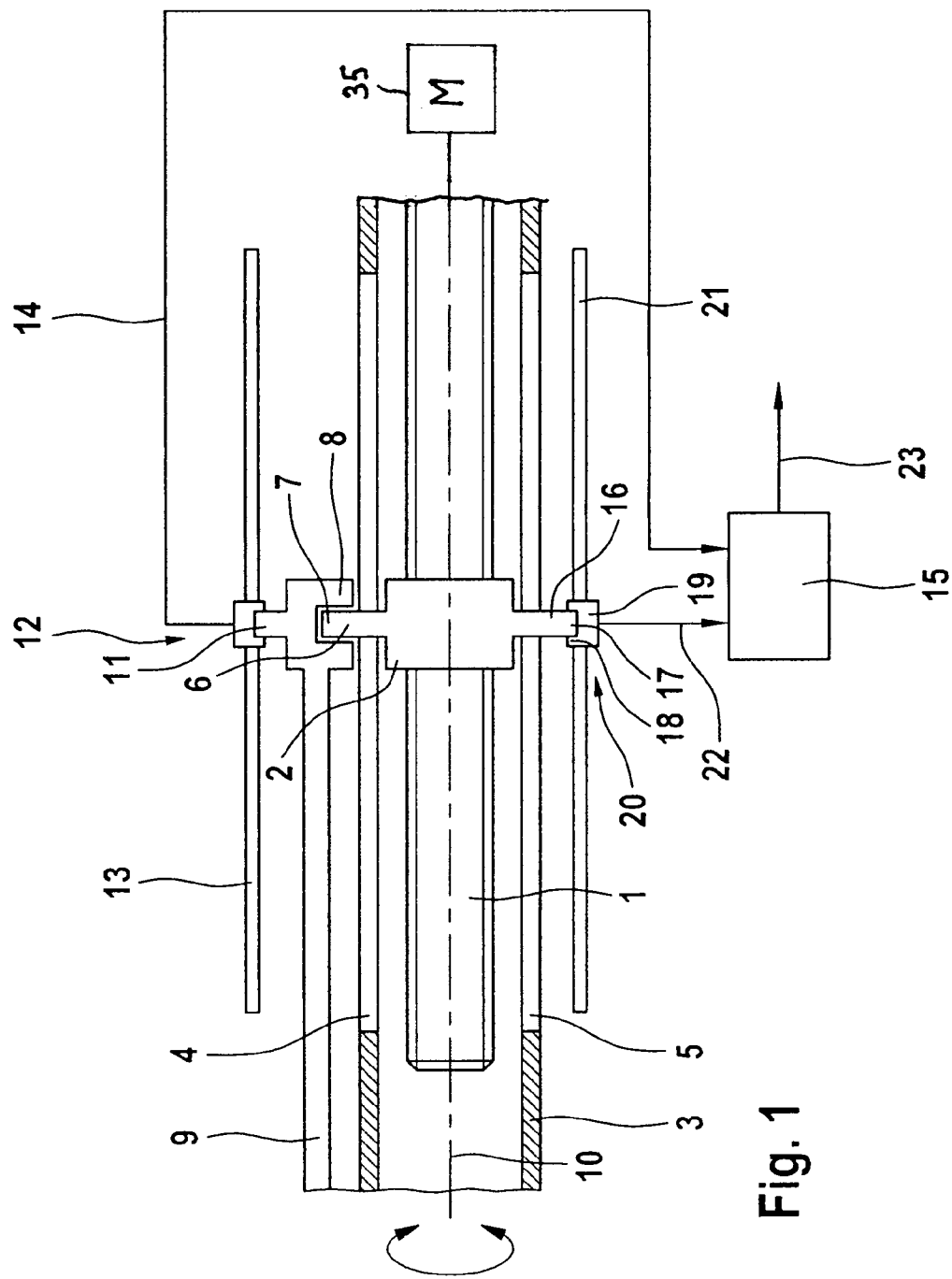
FIG. 1 is a cross sectional view of a first exemplary embodiment of a spindle drive.
FIG. 2 is an end view of the spindle drive according to FIG. 1.

FIGS. 1 and 2 show a spindle drive with a threaded spindle 1 which is supported so that it can rotate around a spindle axis 10. The spindle 1 can be rotated by a reversible electric motor 35. A spindle nut 2 is mounted on the threaded spindle 1 and moves axially on the threaded spindle 1 when the threaded spindle 1 rotates.

The threaded spindle 1 is surrounded coaxially by a guide tube 3 which has an axial driver slot 4 and an axial sensor slot 5 in diametrically opposite positions. These slots extend axially over a distance corresponding approximately to the distance over which the spindle nut 2 can move in the axial direction.

The spindle nut 2 has a radial driver arm 6 which projects through the axial driver slot 4. A free end 7 of the radial driver arm 6 is engageable with a claw 8 of a transmission element 9.

Figure 4:
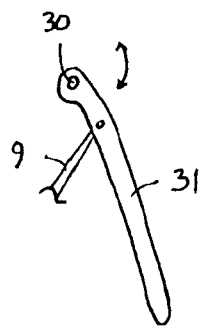
FIG. 4 is a schematic diagram showing a transmission element of the spindle drive of FIG. 1 connected to a movable element.

The transmission element 9 can move axially with respect to the spindle axis 10 and is connected to a hatch 31 of a motor vehicle as shown in FIG. 4. The hatch 31 is pivotable around a pivot axis 30.

A sensor arm 11 connected to the claw 8 forms a wiper of a component position potentiometer 12. The sensor arm 11 is moved by the claw 8 along a sensor track 13 parallel to the spindle axis 10.

An electrical connection 14 leads from the sensor arm 11 to an electronic control unit 15 and supplies the control unit 15 with a signal corresponding to the current position of the transmission element 9.

The spindle nut 2 also has a second radial sensor arm 16 which projects through the axial sensor slot 5. A free end 17 of the second radial sensor arm 16 projects into another claw 18 of a wiper 19 of a nut position potentiometer 20.

The wiper 19 is guided movably along a second sensor track 21 parallel to the spindle axis 10. Another electrical connection 22 leads from the wiper 19 to the control unit 15 and carries a signal corresponding to the current position of the spindle nut 2 to the control unit 15.

In the control unit 15, the signals from the component position potentiometer 12 and the nut position potentiometer 20 are checked for plausibility, and under certain conditions it actuates the electric motor by a control line 23 to rotate the threaded spindle 1. The guide tube 3 can be pivoted around the spindle axis 10 by a certain pivot angle between two end positions.

In the first end position of the guide tube 3, the driver arm 6 engages the claw 8 and the second arm 16 engages the claw 18. Thus, when the threaded spindle 1 rotates in the first end position, both the sensor arm 11 and the wiper 19 are carried along axially with the spindle nut 2.

There is thus plausibility between the signals of the component position potentiometer 12 and those of the nut position potentiometer 20.

The spindle nut 2 is prevented from turning around the spindle axis 10 by interaction between the guide tube 3 and the driver arm 6, which projects into the axial driver slot 4, and by the interaction between the guide tube 3 and the second sensor arm 16, which projects into the axial sensor slot 5.

When the guide tube 3 is pivoted into its second end position, the driver arm 6 pivots away from the claw 8 and becomes disconnected from the transmission element 9.

Because the dimension of the second sensor arm 16 in the circumferential direction is larger than the dimension of the driver arm 6 in the circumferential direction, the second sensor arm 16 nevertheless remains connected to the other claw 18 in the second end position of the guide tube 3.

As a result of the disconnection of the transmission element 9 from the spindle nut 2, the hatch of the motor vehicle, or other movable component, can be moved freely by hand. The transmission element 9 moves only the sensor arm 11 of the component position potentiometer 12 along with it, and thus the position of the transmission element 9 is always detected.

If the hatch is now to be moved by the electric motor again, comparison between the signals of the component position potentiometer 12 and those of the nut position potentiometer 20 indicates that plausibility is not present.

When plausibility is not present, control unit 15 actuates the electric motor, which drives the threaded spindle 1 until plausibility is present again. Once plausibility is present, the guide tube 3 is then turned so that the driver arm 6 pivots back into engagement with the claw 8.

To turn the guide tube 3, the exemplary embodiment shown in FIG. 2 has a toothed segment 24 on one end of the guide tube 3. A reversible pivot drive including a drive pinion 25 driven by an electric motor 32 engages in the teeth of the toothed segment 24.

Figure 3:
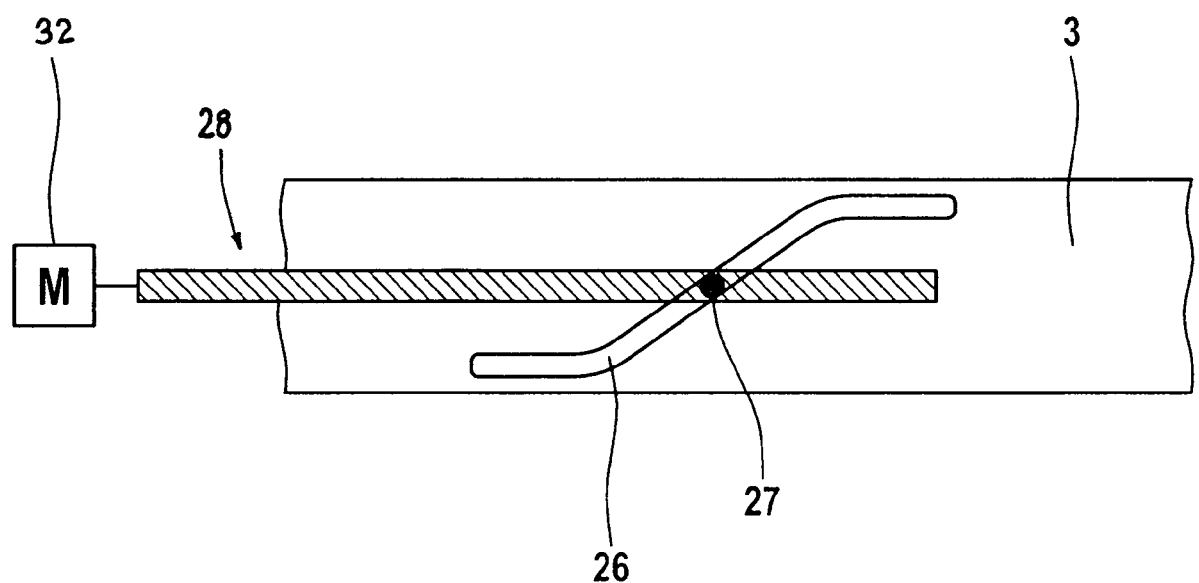
FIG. 3 is a second exemplary embodiment of a pivot drive of the guide tube of a spindle drive according to FIG. 1.

The exemplary embodiment according to FIG. 3 shows a different type of pivot drive for the guide tube 3. Here a groove 26 is formed in the guide tube 3. This groove is at an angle to the spindle axis 10, but its beginning and ending sections are parallel to the spindle axis 10.

A groove block 27 projects into the groove 26. This block 27 can be moved axially with respect to the spindle axis 10 by a reversible axial drive 28 driven by electric motor 32. The axial movement of the groove block 27 has the effect of pivoting the guide tube 3 around the spindle axis 10.

As an alternative, the component sensor and/or the nut position sensor may be designed on the basis of a different principle known or hereafter developed. For example, incremental distance sensors such as Hall distance sensors may be used.

To compensate for the weight of the pivotable component, furthermore, a mechanical spring or a gas spring may additionally be provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spindle drive for a movable component, comprising:
    a threaded spindle;
    a reversible drive connected to said threaded spindle and configured to rotate said threaded spindle about a spindle axis of rotation;
    a spindle nut mounted non-rotatably on said threaded spindle such that said spindle nut moves axially relative to said spindle axis when said threaded spindle is rotated;
    a transmission element connectable to the movable component;
    a connecting device configured to move between a connected position, in which said spindle nut is connected to said transmission element so that said transmission element moves axially with said spindle nut, and a disconnected position, in which said spindle nut is disconnected from said transmission element;
    a nut position sensor configured to generate a first signal corresponding to a current axial position of said spindle nut and a component sensor configured to generate a second signal corresponding to a current position of said transmission element; and
    a control unit receiving said first and second signals and determining whether there is plausibility between the first and second signals, said connecting device being actuatable to move to said connected position only if it is determined that there is plausibility between said first and second signals,
    wherein said spindle nut has a radial driver arm and said transmission element has a claw, said radial driver arm being pivoted between a connecting position and a disconnecting position around said spindle axis when said connecting device is moved between said connected and disconnected positions, where a free end of said driver arm engages in said claw of said transmission element in the connecting position and said driver arm is disengaged from said claw of said transmission element in the disconnecting position.

2. The spindle drive of claim 1, wherein said reversible drive is an electric motor-powered drive.

3. The spindle drive of claim 1, further comprising an axially stationary and pivotably supported guide tube coaxially enclosing said threaded spindle and said spindle nut, said driver arm projecting through an axial driver slot in said guide tube, a length of said axial driver slot is at least equal to an axial distance of a travel length of said spindle nut, wherein said spindle nut with said driver arm is pivoted between said connecting position and said disconnecting position.

4. The spindle drive of claim 3, further comprising a reversible pivoting drive and at least one of a gear wheel or a toothed segment on said guide tube, wherein a drive pinion of said reversible pivoting drive engages said at least one of a gear wheel or a toothed segment directly or indirectly.

5. The spindle drive of claim 3, further comprising a reversible axial drive, wherein said guide tube has a groove extending at an angle to said spindle axis, a groove block of said reversible axial drive which is driven axially with respect to said spindle axis projects into said groove and rotates said guide tube about said spindle axis when said groove block is driven axially.

6. The spindle drive of claim 4, wherein said pivot drive is an electric motor-powered pivot drive.

7. The spindle drive of claim 5, wherein said axial drive is an electric motor-powered axial drive.

8. The spindle drive of claim 1, wherein said transmission element has a sensor arm which is movable along a sensor track of the component sensor, the sensor track extending axially with respect to said spindle axis.

9. The spindle drive of claim 7, wherein said component sensor is a component position potentiometer.

10. The spindle drive of claim 3, wherein said spindle nut has a second radial sensor arm projecting through an axial sensor slot in said guide tube, a length of the axial sensor slot being at least equal to the travel length of said spindle nut, and said second sensor arm moving along a second sensor track of said nut position sensor, said second sensor track extending axially with respect to the spindle axis.

11. The spindle drive of claim 9, wherein said nut position sensor is a nut position potentiometer.

12. The spindle drive of claim 10, further comprising a wiper guided with freedom of axial movement on said second sensor track, said wiper having another claw in which a free end of said second sensor arm engages.

13. The spindle drive of claim 1, further comprising the moveable component, wherein the moveable component comprises a pivotable component pivotable about a pivoting axis, wherein said transmission element is hinged to said pivotable component a radial distance away from the pivot axis.

14. The spindle drive of claim 1, further comprising the movable component, wherein said movable component is a door or a hatch of a motor vehicle.

* * * * *